United States Patent [19]
Cookson et al.

[11] Patent Number: 4,551,718
[45] Date of Patent: Nov. 5, 1985

[54] METHOD AND APPARATUS FOR TRANSMITTING STATUS INFORMATION BETWEEN REMOTE LOCATIONS

[75] Inventors: John A. Cookson, Bozeman; Richard L. Schatzka, Butte; Richard A. Echard, Butte; Gary W. Scheer, Butte, all of Mont.

[73] Assignee: Tetragenics, Inc., Butte, Mont.

[21] Appl. No.: 507,560

[22] Filed: Jun. 24, 1983

[51] Int. Cl.⁴ .................. H04Q 9/00; G06F 15/20; H04L 11/16
[52] U.S. Cl. .................. 340/825.16; 340/506; 340/517
[58] Field of Search .................. 340/825.16, 870.16, 340/870.19, 505, 517, 518, 506, 524, 525, 825.17, 825.18, 825.12, 825.13, 825.36, 825.06; 364/480, 483

[56] References Cited
U.S. PATENT DOCUMENTS

| | | |
|---|---|---|
| 2,875,327 | 2/1959 | Halvorson et al. . |
| 3,517,125 | 6/1970 | Peterson et al. . |
| 3,654,607 | 4/1972 | Wavre et al. . |
| 3,718,925 | 2/1973 | Donn et al. . |
| 3,737,861 | 6/1973 | O'Neill et al. . |
| 3,792,469 | 2/1974 | McLean et al. . |
| 3,855,456 | 12/1974 | Summers .................. 340/517 |
| 4,057,785 | 11/1977 | Furniss et al. .................. 340/825.06 |
| 4,070,650 | 1/1978 | Ohashi et al. . |
| 4,090,248 | 5/1978 | Swanson et al. .................. 340/825.06 |
| 4,180,801 | 12/1979 | Cailloux . |

OTHER PUBLICATIONS

Product Information Bulletin; Canadian Marconi Company; Telecommunications Division.
Technical Manual on the Quindar 54829D Mocro--Processor Module for Monitoring and Controlling Various Electrical Devices . . . ; Quindar Products Ltd.; Sep. 1978.
System Software Description for the Control of Manitoba Hydro HVDC Bi-Pole 2; Quindar Products Ltd.; R. J. Boulanger; Jun. 1978.

*Primary Examiner*—Donald J. Yusko
*Attorney, Agent, or Firm*—Christensen, O'Connor Johnson & Kindness

[57] ABSTRACT

A system for transmitting status information from a first location to a remote second location includes a monitoring device at the first location for monitoring the state of a plurality of relays or other devices that are capable of being in either an active or inactive state. The monitoring device produces a digital signal representative of the state of the relays. A first memory storage device contains a table of digital codes arranged so that a unique code is associated in a predetermined manner with each relay in each state. A processor is provided for processing the digital signal from the monitoring device and for accessing the table to retrieve the code associated with the present state of each relay. The processor also produces a first signal indicative of a change of state of any relay from the inactive to the active state. A transmitter transmits the codes retrieved from the processor in a predetermined sequence. An interrupt device is included that interrupts the transmission sequence in the presence of the first signal to cause the immediate transmission of the code associated with the relay that has changed from the inactive to the active state. A receiver at the remote second location receives the transmitted codes and verifies their validity by comparing the received codes to a table of expected codes contained in a second memory storage device. If the code received is valid, a decoder determines the relay and state represented and formulates and outputs a control word representative of the state of the monitored relays. If the code is invalid, an alarm signal is generated that inhibits the output of a control word. Once an alarm signal is generated, it is maintained until a valid code is received for each of the monitored relays without the reception of an intervening invalid code. Preferably, the transmission and reception of the codes are accomplished under control of a digital computer operating under program control.

19 Claims, 15 Drawing Figures

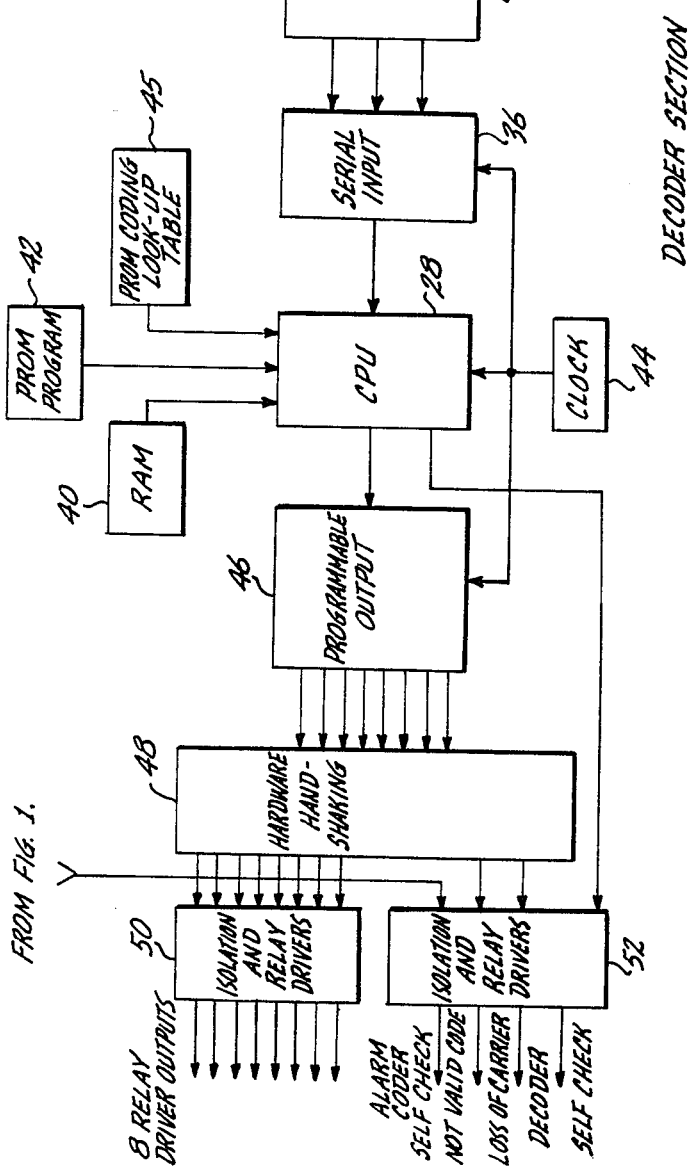

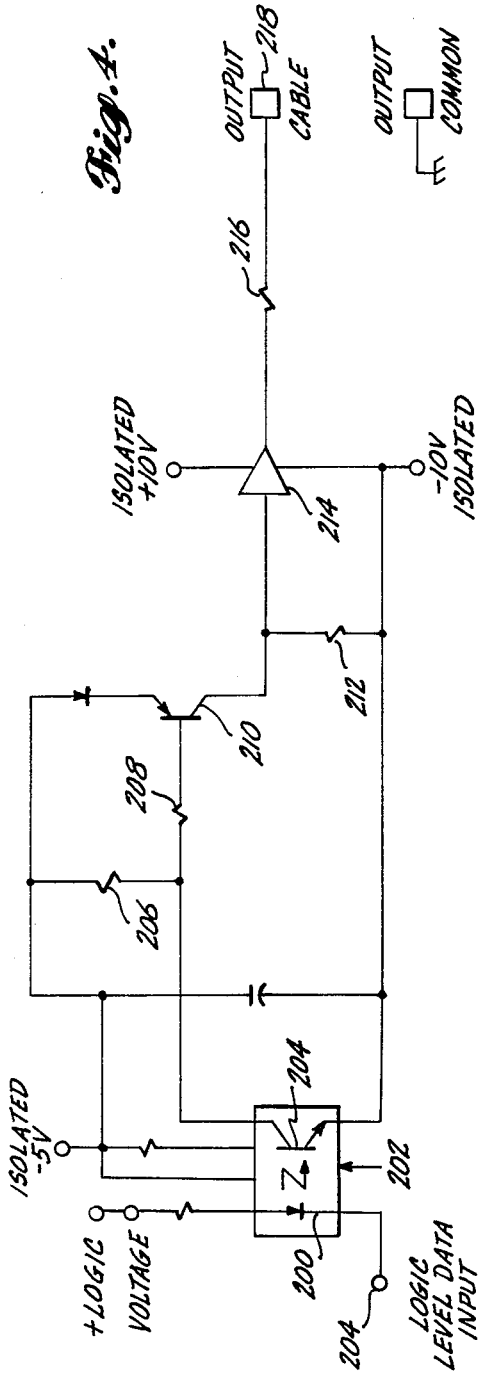
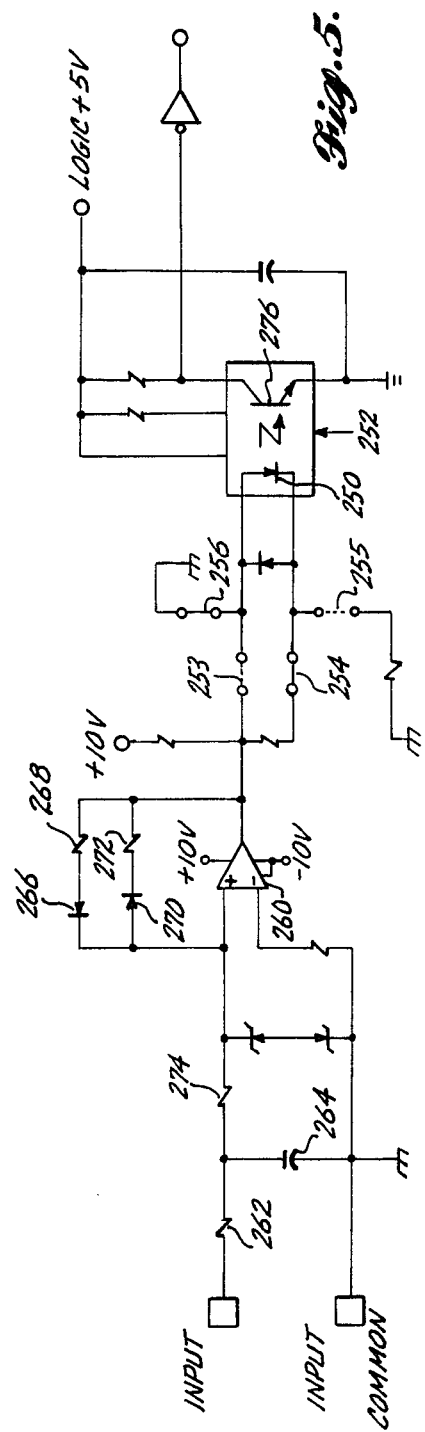

| |
|---|
| 1 DOT 0 |
| 2 DOT 1'S |
| 4 DOT 2'S |
| 8 DOT 3'S |
| 16 DOT 4'S |
| 32 DOT 5'S |
| 64 DOT 6'S |
| 128 DOT 7'S |

*Fig. 8.*

ALL 16 BIT ADDRESSES

*Fig. 9.*

| | 2ND BYTE | 1ST BYTE |
|---|---|---|
| GUARD 0 | 2ND BYTE | 1ST BYTE |
| GUARD 1 | 2ND BYTE | 1ST BYTE |
| • | • | • |
| • | • | • |
| • | • | • |
| GUARD 7 | 2ND BYTE | 1ST BYTE |
| TRIP 0 | 2ND BYTE | 1ST BYTE |
| TRIP 1 | 2ND BYTE | 1ST BYTE |
| • | • | • |
| • | • | • |
| • | • | • |
| TRIP 7 | 2ND BYTE | 1ST BYTE |

CODE TABLE

METHOD AND APPARATUS FOR TRANSMITTING STATUS INFORMATION BETWEEN REMOTE LOCATIONS

BACKGROUND OF THE INVENTION

This invention relates to the transmission over long distances of status information and more particularly relates to the transmission of critical equipment status information in a fast and yet reliable manner.

In the operation of electrical power distribution systems, it is often necessary to communicate information concerning the status of a portion of the transmission network from one substation to a second remote substation. Such a communication is particularly necessary when a malfunction occurs in a portion of the system and it is desired to provide that information to a remote substation so that some or all of the equipment in a remote portion of the system can be placed off-line to prevent the malfunction from damaging such equipment or spreading to other portions of the transmission network. In many cases, the sending and receiving substations are unmanned and therefore the detection of a fault condition and the transmission of the information concerning that fault condition must be accomplished automatically.

In order to prevent a malfunction in one portion of the transmission network from spreading to a second portion, it is necessary to transmit information relating to the occurrence of a fault condition rapidly. At the same time, however, the consequences of shutting down a high-voltage power transmission line unnecessarily make it necessary that the fault information be accurately and reliably transmitted so that false shutdown or "trip" signals do not occur. It is therefore an object of the present invention to provide a data transmission system that is capable of rapidly and reliably transmitting data indicative of the change of state of one of the monitored devices to a fault condition.

It is another object of this invention to provide such a transmission system that assesses the validity of received data and prevents the use of invalid data. The data output at the receiving end is only enabled upon reception of valid information for all of the monitored devices.

Certain transmission systems that now exist utilize a separate communications channel for each device that is being monitored resulting in a duplication of equipment. Therefore, it is also an object of this invention to provide a system that will transmit status data corresponding to all monitored devices over a single communication channel.

SUMMARY OF THE INVENTION

In accordance with the objects set forth above, a method and apparatus for transmitting status information relating to a plurality of devices from a first location to a remote second location is provided. According to the method, a plurality of devices are monitored at the first location, each device being in either an active or inactive state. A table of digital codes is assembled such that a distinct code is associated with each possible state of each device being monitored. The present state of each device is determined and the proper digital code corresponding to that particular state for that particular device is assigned based on the determination. Another determination is made as to whether or not any of the monitored devices has changed from the inactive to the active state since the last monitoring took place. Each of the assigned digital codes determined by the monitored present state of each device is then transmitted in a predetermined sequence. If, in fact, a change to the active state has occurred for any of the monitored devices, the predetermined sequence is interrupted to transmit the digital code associated with the active state for the device that has changed to the active state as the next transmission. The transmitted digital codes are received at the second location in the order that they are transmitted. The received codes are compared with an assembled table of codes to determine whether the received codes are valid information. If the received code is valid, then decoding of the code takes place to determine the particular device and state represented by the transmitted digital code. Once the decoding is accomplished, the status information based on the most recent code received is output from the system. If any invalid code is received, the outputs from the system are inhibited so that so status information is output until validity of the information is reestablished. The validity of the system is reestablished only after the reception of a valid digital code for each of the monitored devices.

Apparatus for carrying out the above method is also provided in accordance with the principles of this invention. The apparatus includes, at the first location, a first means for monitoring the state of the plurality of devices to determine if they are each in an active or inactive state. The first means produces a digital status word representative of the state of the devices. A first memory storage means contains a table of digital codes arranged so that a unique code is associated with each device in each of its states. Second means are provided for processing the digital status word and for accessing the table to retrieve the digital code associated with the present state of each device. The second means also produces a first signal indicative of a change of state of any of the devices from the inactive to the active state. Transmitter means receives the digital codes from the second means and transmits them to the second location in a predetermined sequence unless the first signal is present. In the presence of the first signal the transmission sequence is interrupted so that the next code transmitted in the code associated with the device that has just changed to the active state. At the second location, a receiver means receives the digital codes. A second storage means contains a table of values representative of the digital codes. A verification means compares the received codes with the table values to determine the validity of the received codes. If the code is valid, a decoder means determines the device and state represented by the received code and cooperates with an output means to produce and output a digital control word representative of the state of the monitored devices. If the code is invalid, the verification means produces an alarm signal that triggers an inhibiting means to inhibit any output of the digital control word. Once the verification means produces an alarm signal, that signal is maintained until a valid code is received for each of the monitored devices without the reception of an intervening invalid code. In the preferred embodiment, the method is carried out by a digital computer acting under program control.

BRIEF DESCRIPTION OF THE DRAWINGS

The features and advantages of the present invention will be better understood by those of ordinary skill in the art and others upon reading the ensuing specification when taken in conjunction with the appended drawings wherein:

FIG. 1A is a block diagram of one embodiment of the decoder/receiver portion of the data monitoring and transmission system of the present invention;

FIG. 4 is a schematic diagram of a level-changing interface circuit suitable for use in the transmitter portion of the system shown in the block diagram of FIG. 1 to interface between logic levels and RS232C levels;

FIG. 5 is a schematic diagram of a level-changing interface circuit suitable for use as an input circuit to the receiver portion of the system shown in the block diagram of FIG. 1A for interfacing between RS232C levels and logic level;

FIG. 8 is a schematic representation of a table in a memory device in the transmitter portion that contains a plurality of reference digital representations, each corresponding to an address of a routine utilized in the transmission of information from the system of FIG. 1;

FIG. 9 is a schematic representation of memory locations in a memory device in the transmitter portion used for the storage of digital codes to be assigned to the various states of the monitored devices;

DETAILED DESCRIPTION OF THE PREFERRED EMBODIMENT

A preferred embodiment of a system for transmitting coded status information from a first location to a remote second location and then decoding that information at the second location in accordance with the principles of the present invention is described and illustrated herein. While the invention is described in the environment of a power transmission network, it could be used for sending and receiving status information in any environment in which information regarding the state condition of a given set of devices needs to be transmitted over long distances in a rapid, yet reliable, manner.

Figure 1:
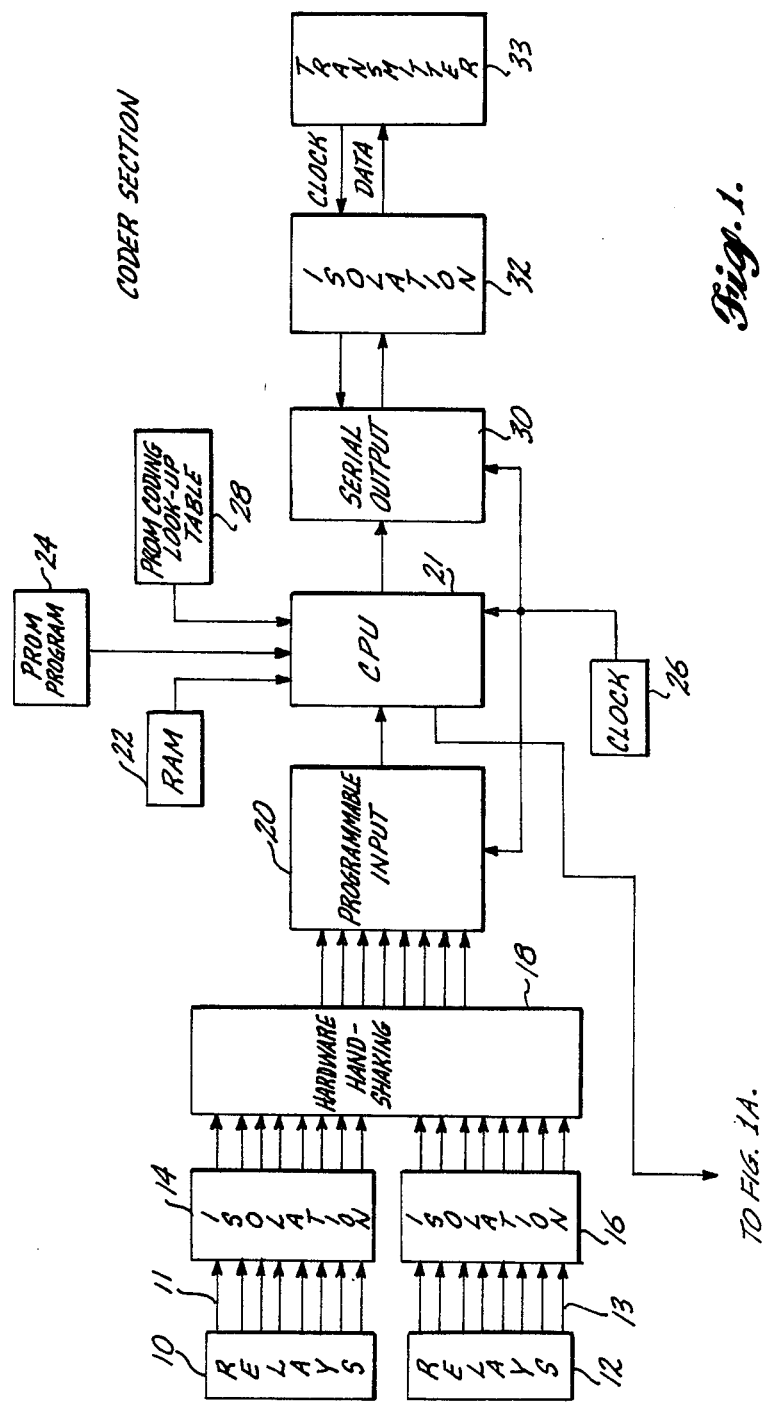
FIG. 1 is a block diagram of one embodiment of the decoder/transmitter portion of the data monitoring and transmission system of the present invention.

Referring now to FIGS. 1 and 1A, a coder/decoder system for monitoring the status of a predetermined number of input devices and transmitting that data to a remote location and conversely receiving similar status information from the remote location and providing a status signal representative of that transmitted status information is presented. In the power substation environment, the input devices represented by block 10 could be a bank of relays (numbering eight in the illustrated embodiment) that are indicative of the status of various segments of a power transmission network. If operations are normal, the relays will be in an inactive or "guard" condition and will provide a zero-volt input to the data lines represented by arrows 11. In the event a malfunction occurs in a portion of the network, the relay associated with that portion would be placed in an active or "trip" condition in which case it would provide a positive voltage on the input lines 11 that would be equal to the voltage of the battery powering the particular substation. Typical substation arrangements have battery supplies of either 48 volts or 129 volts. Therefore, the zero voltage levels from the relays would indicate proper operation of the particular portion of the network while a voltage signal at battery level on one of the relay lines would indicate a malfunction in the monitored portion of the network.

The second set of input devices represented by block 12 in FIG. 1 in the power station environment represents another bank of relays, again numbering eight, that, in the preferred embodiment, monitor the same portions of the network monitored by the devices in block 10. The second set of input devices is a backup for the first set to ensure that any trip conditions that occur are noted by the system. The inputs on the input lines represented by the arrows 13 would again be zero voltage for a guard condition and a station battery positive voltage of either 48 or 129 volts DC for a trip condition.

Because the substation battery that provides the voltage for the relays of blocks 10 and 12 also powers the remaining equipment in the station, the voltage is subjected to the energizing and deenergizing of various inductive loads that induce noise spikes onto the DC voltage. In order to clean up the voltage signal and to prevent such noise spikes caused by the inductive loads from interfering with the inputs to the coder portion of the system, the inputs on lines 11 and 13 are fed into isolation circuits 14 and 16, respectively. Each isolation circuit ensures that only a true trip code will be transmitted to the remainder of the system and blocks any noise spikes that occur. The isolation circuits 14 and 16 also convert the station battery voltage levels representative of a trip condition to standard TTL logic levels with a guard condition being a logic 0 and trip condition being a logic 1.

The inputs from the relays after passing through the isolation circuits 14 and 16 are now eight-bit bytes of digital data with logic 1's in the bit positions corresponding to relays in the trip state. The outputs from the isolation circuits are provided to a handshaking circuit 18 that in turn interfaces with a digital computer comprising in part a programmable input 20 connected to a central processor unit 21. One example of a suitable central processor unit or CPU is the microprocessor manufactured and sold by Zilog Corporation under the designation Z-80 CPU. The operation of the Z-80 CPU microprocessor is described in the publication by Zilog entitled "Z-80 User's Manual" which is incorporated herein by reference. A suitable programmable input device is the Z-80 PIO manufactured and sold by Zilog Corporation. The programmable input 20 operates in connection with the central processor unit 21 to read first one eight-bit word corresponding to the inputs of block 10 and then another eight-bit data word corresponding to the inputs of block 12. The processor 21 then combines the two data words by a logical "OR" operation to produce a single eight-bit data word. Therefore, if a trip condition exists on any one of the eight relay inputs of either the devices of block 10 or the devices of block 12, the bit corresponding to that relay will be a logic 1. The computer also has a randomaccess memory device or RAM 22 associated with the central processor unit 21. The computer includes a programmable memory or PROM 24 that is preprogrammed to contain operating instructions for the central processor unit 21 with which it analyzes and decides the transmission of data. A suitable RAM is the one made and sold by RCA under the designation CPM6116-1. A suitable PROM is the 2732 made and sold by Intel Corporation. A clock 26 is provided that produces the timing pulses necessary for the operation of the programmable input 20 and the central processor 21. A second programmable memory 28 of the same type as the first PROM 24 is provided that contains a table of digital codes. Each of the digital codes corresponds to a trip or guard condition of one of the input devices. The table in PROM 28, therefore, has, for an eight-input system, a total of 16 digital codes each different from the other. In the preferred embodiment, utilizing a Z-80 microprocessor, each digital code contains 16 bits. Each of the 16 bits is divided into a first byte of eight bits and a second byte of eight bits. The processor examines each of the bits in the digital word formed from the inputs from the programmable input 20 and determines the state, whether a guard or a trip, of each input device. The appropriate digital code from the table in PROM 28 associated with the guard or trip condition for each of the inputs is assigned to each device for transmission to the remote location. Once the appropriate digital code is assigned, the code is transferred to a serial output device 30 from which it is serially output to a second isolation device 32, which in turn is connected to a transmitted 33. A suitable serial output device is the model No. Z80-SIO distributed by Zilog Corporation. The digital code representative of the state of each monitored device of blocks 10 and 12 is transmitted in a predetermined sequence, for example, if the eight devices are numbered 0 through 7, the digital codes associated with the state of each device are transmitted in the order of: device 0, device 1, then device 2, 3, 4, et cetera, up to 7. The transmission medium can be any suitable transmission medium and in the preferred embodiment comprises T1 microwave transmission equipment. The transmission could also be through telephone lines through use of a modulator/demodulator unit or could even be simply a direct wire if the surrounding circumstances permitted. The isolation device 32 transforms the signal from the central processor unit from TTL logic levels to whatever levels are required by the particular transmission medium. If a T1 microwave transmission set is utilized as the transmission medium, a synchronizing input from the T1 equipment is provided through the isolation device 32 to clock the transmission of data. Otherwise, the internal clock of the coder/decoder system could be utilized to clock the data.

One important feature of the present device is its ability to transmit information regarding changes from a guard to a trip condition quickly. This is accomplished by interrupting the predetermined sequence of transmission of the state of the monitored devices to transmit a change of state from a guard to a trip condition immediately upon detection of the out-of-sequence trip information. For example, as discussed above, the normal order of a transmission would be : guard 0, guard 1 . . . guard 7. If, however, monitored device 4 changed from a guard to a trip condition during the transmission of a guard 5 signal, the system would react to transmit as its next output the code associated with a trip condition on device 4, i.e., a trip 4 signal, before it resumed the sequence to transmit a guard 6 signal. Therefore, for a trip condition occurring on a device 4, during transmission of a guard 5 signal, the transmission sequence would look as follows: guard 0, guard 1, guard 2, guard 3, guard 4, guard 5, trip 4, guard 6, guard 7. After transmission of the trip 4 signal, the system would return to its original sequence and as long as the trip condition remained on device 4 it would continue to be transmitted in the predetermined sequence so that the following sequence would occur: guard 0, guard 1, guard 2, guard 3, trip 4, guard 5, guard 6, guard 7. Since a return from a trip condition to a guard condition is not a matter of as great urgency, the predetermined transmission sequence is not interrupted for a change in state from the trip to the guard condition, but only from a guard to a trip condition.

FIG. 1A shows a block diagram of a decoder section of the system of the present invention that receives transmitted status information, decodes it, and outputs it to some device that can then utilize the information. It should be noted that while the decoder section of FIG. 1A would physically be present at the same substation as the coder section, the signals received by the decoder section of FIG. 1A are not those transmitted by the coder section of FIG. 1, but rather are signals that are received from a coder identical to that shown in FIG. 1 but located at a substation remote from the decoder. That is, the coder of FIG. 1 is transmitting signals to a decoder other than that shown in FIG. 1A, while the decoder of FIG. 1 receives signals from a coder other than the one shown in FIG. 1. The coder of FIG. 1 and decoder of FIG. 1A are typically housed in a common cabinet. The decoder section includes a third isolation device 34 that receives data from a receiver 35 and converts it to TTL logic levels. A synchronizing clock signal from the receiver may also be provided to the third isolation device 34 along with a CARRIER DETECT indication that monitors the presence of a carrier signal from the transmission medium. The isolation device 34 converts the input data to a usable TTL logic level and transfers the input data to a serial input device 36 from which it is transferred to a second central processor unit 38 (CPU), again in the preferred embodiment, a Zilog Z-80 microprocessor chip. The CPU 38 has associated with it a random-access memory (RAM) 40 that it utilizes in processing the received information. In the preferred embodiment, the processor is under control of a program stored in a programmable memory (PROM) 42 and a clock 44 is associated with the processor to provide internal timing of operation. The processor 38 analyzes the incoming data signals in the order in which they are received and first determines whether or not the data represents a valid guard or trip code that could have been transmitted from the remote coder. The validity check is accomplished by reference to a table of valid codes stored in a PROM 45 associated with the CPU 38. The details of the validity check will be discussed later. If the data does represent a valid code, the data is then decoded to determine the condition, whether guard or trip, and the particular device from 0 through 7 that the received code represents. Once the data is decoded, that information is transferred to a programmable output device 46 that transfers the information through a second handshaking circuit 48 to an isolation and relay driver circuit 50 that transforms the data from TTL levels to station battery levels and drives a related output device, for example, another relay, to complete the transfer of status information from the input relays at the remote substation to the devices located at this substation connected to the isolation and relay drivers. A second isolation and relay driver device 52 is provided to output signals related to the status of the coder and decoder and to energize warning indicators to indicate the condition of the coder and decoder. For example, if the CPU 38 determines that an incoming code represents invalid data, a signal is transferred through the isolation and relay driver 52 to energize an alarm to indicate an invalid code. Similarly, if the CARRIER DETECT signal is not provided to the third isolation device 34, a signal is sent through the isolation and relay driver 52 to energize an alarm to indicate loss of carrier. Both the coder and decoder have self-test features incorporated therein that indicate whether the hardware portion of the coder and decoder are operating correctly. In the event either the coder or the decoder malfunctions, a signal is sent through the isolation and relay driver 52 to energize an alarm indicating that either the coder or decoder self-check has failed. As indicated above, in the preferred embodiment, the coder/decoder system works under program control of a data processor to perform the desired functions. The particular features of the program control will be discussed below.

Figure 2:
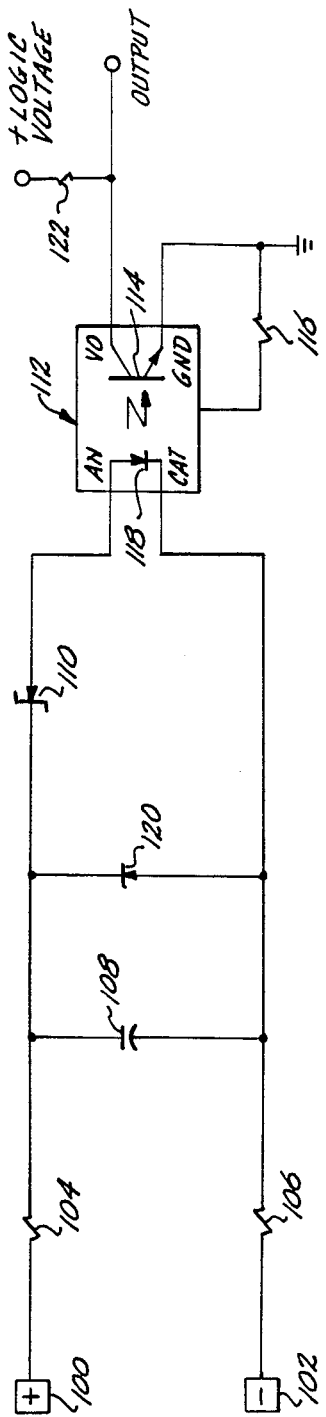
FIG. 2 is a schematic diagram of an input interface circuit for use at the input of the coder section of the system of FIG. 1.

FIG. 2 is a schematic diagram of a typical input circuit utilized in the isolation devices 14 and 16 to interface between the input relays 10 and 12 at battery voltage levels and the processor logic circuits at TTL levels. As stated before, the voltage values of a station battery can be either 48 volts DC or 129 volts DC. Solid-state monitoring devices that exist in this environment have greater flexibility if digital monitoring and control functions can easily interface with the station battery voltage. The circuit shown in FIG. 2 was designed to accept a high-voltage switching input, isolate this signal from the logic power bus, and convert the signal to acceptable logic voltage levels. Since the station battery is used to power many inductive switching devices, an extreme noise level associated with the battery voltage exists. The digital input circuit of FIG. 2 is able to filter and block the noise signals and still distinguish a valid voltage level signal.

Referring in detail to FIG. 2, when the battery voltage is applied to the input terminals 100 and 102, current flows through resistors 104 and 106. Capacitor 108 filters the high-frequency noise components in the signal. The DC voltage level of the filtered signal must be large enough to overcome the reverse breakdown potential of zener diode 110. The required potential needed to pass current through zener diode 110 establishes a deadband at which no signal can pass to the input of the photocoupler 112. This design has been found to be very effective at eliminating false noise signals being detected by the logic circuitry. Once the potential is sufficient to cause current to flow through zener diode 110, the photocoupler 112 is activated and a corresponding logic level signal is established at the collector of the phototransistor 114. Resistor 116 is tied to the base of a phototransistor 114 and has the effect of shunting the base emitter junction and establishing a minimum current required through photodiode 118 to activate the phototransistor 114. This eliminates false signals passing through the photo-isolator 112 due to leakage curent flowing through zener diode 110. A diode 120 is placed in the circuit in parallel with the capacitor 108 to provide a current path to protect the photo-isolator 112 in the event reverse voltages are applied to the input terminals. In the preferred embodiment, the photo-isolator used is an integrated circuit chip manufactured by Hewlett-Packard and sold under the designation 4N46. The values of the resistors, capacitors and diodes are determined by the station battery voltage with which the system is being used, either 48 volts or 129 volts. For a 129-volt system, the following values are suitable: resistor 104 and 106–6200 ohms, resistor 116–1500 ohms, capacitor 108–0.01 microfarads; diode 120 is a type IN4004 and zener diode 110 is a type IN4757. The bias resistor 122 is 2700 ohms. A separate input circuit of the type shown in FIG. 2 is associated with each of the monitored devices.

Figure 3:
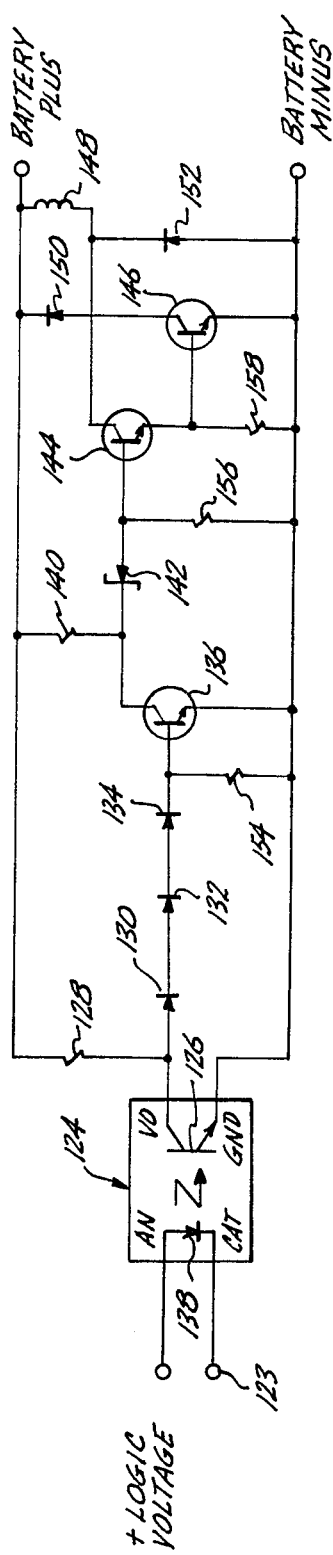
FIG. 3 is a schematic diagram of a relay driver circuit used in the receiver portion of the system shown in FIG. 1A.

FIG. 3 shows a typical circuit from the isolation and relay driver device 50 that interfaces the logic levels from the programmable output 46 with the station battery voltages utilized in the output devices that are to be driven by the transmitted data signals. The circuit shown in FIG. 3 provides the interface between the TTL digital voltage levels of 0.8 volts to 2.4 volts DC and a DC voltage relay coil either 48-volt or 129-volt as required by the particular application. Three thousand-volt DC circuit isolation is provided between the logic power and the station battery power used to drive the relay. TTL is a standard logic family that outputs a relatively low power signal level. Therefore, signal power conversion is required in order to provide enough power to drive the DC voltage relay coil common in power system environments. It is also critical that the five-volt DC power bus on the TTL circuitry remain noise free and therefore, electrical isolation is required between the logic power supply and any other external power sources.

Isolation is provided by an optical isolator 124 and in the preferred embodiment a suitable isolator is the same 4N46 optical isolator manufactured and sold by Hewlett-Packard that was used in the interface circuit discussed above. The output of this isolator is a transistor switch 126. The collector of the transistor 126 is tied through resistor 128 to the plus side of the station battery power source. The collector of transistor 126 is also connected through three diodes 130, 132, and 134 in series to the base of a second transistor 136. The emitter of transistor 136 and the emitter of the transistor 126 in the photoisolator are tied to the minus side of the station battery. When the photodiode 138 of the optical isolator 124 is activated by application of a logic level to input 123 the transistor 126 of the isolator saturates and brings its collector voltage to within 1.5 volts of its emitter potential. This voltage is too low to forward bias the series diodes 130, 132 and 134 and the base of the second transistor 136 and therefore, the second transistor 136 is cut off. Current flowing through a resistor 140 connected to the collector of the transistor 136 must now pass through the 10-volt zener diode 142 and to the base of the Darlington pair output transistors 144 and 146. This provides a current sink at the collectors of the Darlington pair and will activate a relay coil 148 attached between this current sink and the positive side of the battery power source. The voltage at the collector of transistor 136 cannot rise above the zener voltage and the forward bias voltage at the base of the Darlington pair. The circuit is designed so this voltage totals about 11.5 volts and therefore, the second transistor 136 does not require a high-voltage rating.

If the photodiode 138 of the optical isolator 124 is deactivated, then the transistor 126 in the isolator is cut off. The voltage at the collector will rise until the series diodes and base of transistor 136 are forward biased. This occurs at approximately 2.1 volts. Because of this clamping effect, the optical isolator 124 does not require a high-voltage output rating. The transistor 136 is now saturated and its collector is well below 11.5 volts. All the current flowing through pull-up resistor 140 will now drain through transistor 140 to the minus side of the station battery. No current will flow through the base of the Darlington pair 144 and 146. The voltage on the collectors of the Darlington pair will rise to the positive voltage level and will therefore deenergize the relay coil 148. The diode 150 is in place so that the collector voltage of transistors 144 and 146 will not rise above the DC voltage source due to inductive kickback from the relay coil 148. Diode 152 is in place for reverse voltage protection of the output transistors 144 and 146. Resistors 154, 156 and 158, attached to the bases of transistors 136, 144 and 146 respectively, bleed off residue charge and provide for a quicker response of the circuit.

Inherent in the relay driver circuit design shown in FIG. 3 are features that are important in the design of the illustrated embodiment of the present invention. One such feature is a security measure implemented in the design in that all the interface external to the logic is powered by the station battery. This ensures that no action can occur in the relay driver circuit until the station battery is applied to the circuit. This is the same power source that supplies power to the relay coil and, therefore, if no power is applied to properly bias the relay driver circuit, no false operations can occur since there is no power to the relay. Another important feature of the circuit of FIG. 3 is the current-blocking effect of diodes 130, 132, 134 and zener diode 142. Diodes 130, 132 and 134 combine to form a voltage set point and zener diode 142 provides a voltage set point that together make a triggerlike effect of the circuit. The switching input of the isolator provides absolute saturation or cutoff to the various transistors in the circuit providing less power dissipation in the active components and thus longer life. The values of the components of the circuit of FIG. 3 are dependent on whether the battery voltage is 48 or 129 volts. For a 129 volt system, typical components are type IN914 diodes for diodes 130, 132 and 134. Zener diode 142 can be a type IN4740. A suitable transistor 136 is a type 2N3904 and transistors 144 and 146 are type 2N3439.

FIGS. 4 and 5 illustrate isolation circuits utilized with the isolation devices 32 and 34, respectively. FIG. 4 illustrates a circuit used in the coder section to interface between the logic levels from the CPU 21 and the levels required by the transmission medium. FIG. 5, in turn, shows a circuit for interfacing between the input from the transmission medium and the logic levels applied to the CPU 38. As discussed earlier, the speed of transmission of the various status inputs is critical to proper operation of power transmission systems. The current invention is designed for use at transmission rates of up to 56K baud. A standard level used with serial communication data streams is an RS232C interface level. The electrical characteristics of this standard interface specify a mark (logic 1) as a voltage level of −3 volts to −25 volts. A space (logic 0) is +3 volts to +25 volts. A voltage level between −3 volts and +3 volts is considered invalid as a data level and only occurs during the transitions between mark and space, or, in other words, logic 1 and logic 0. Generally, the maximum data transmission rate that can be used with RS232C interfaces is 19.2K baud and standard devices that interface RS232C levels and logic are not designed to perform at switching speeds greater than 19.2 kHz. The RS232C standard voltage level is used in the device of the present invention because of the excellent noise immunity characteristics of this relatively high-voltage signal level. Therefore, it was necessary to design RS232C level to logic level interfaces that could handle the required data rate of up to 56K baud. Also, it remains required that all interfaces to the present system be electrically isolated such that the logic voltages are not affected by external voltage transients because of the use in a noisy battery powered substation environment. Because of the high speed requirements, special features are implemented in the transmitting circuit and the receiving circuit of FIGS. 4 and 5, respectively. The transmitting circuit of FIG. 4 has a high current-driving element in order to sufficiently drive the capacity load of the communication cable. The receiver circuit of FIG. 5 required filtering and hysteresis to provide a −3 volt/+3 volt deadband. Also, the circuits must have good noise immunity in the power station environment.

The output circuit of FIG. 4 transmits a mark or logic 1 condition when the photodiode 200 of the photo-isolator 202 is activated. When the serial output device 30 outputs a logic 1 level to the input 204 of the photoisolator 202 the photodiode 200 is activated and the output transistor 204 of the isolator 202 saturates and conducts current through resistors 206 and 208 causing a transistor 210 to conduct. Current through transistor 210 passes through a resistor 212 causing the input of the driver 214 to rise to a high-voltage level. The output of the driver 214 goes to −10 volts. A resistor 216 is in series with the driver output and is of a value selected to match the impedance of the output cable 218 and provide a clean signal transmission to the output cable 218. If the photodiode 200 of optical isolator 202 is deactivated by application of a logic 0 from the serial output 30, the output transistor 204 cuts off and passes no current. This causes the voltage on the collector of the transistor 204 to rise and cut off transistor 206. No current passes through transistor 206 and the input to driver 214 is pulled low by resistor 212. The output of the driver 214 goes to +10 volts and the transmitted signal to cable 218 is a space of logic 0. The photo-isolator 202 is preferably a Hewlett-Packard HPCL 2601 and the driver 214 is a AM0026.

Referring now to the receiver interface circuit of FIG. 5, the jumper options shown in the circuit of FIG. 5 allow the user to decide whether the diode 250 of the photo-isolator 252 is activated with a high level at its input or a low level at its input. With the jumpers at 253 and 255 in place at the locations shown, and the jumpers 254 and 256 removed, a high input level activates the diode 250 and a low level deactivates the diode 250. The opposite condition is obtained with jumpers 253 and 255 removed and jumpers 254 and 256 in place. This discussion will presume the latter condition so that a high input level will deactivate the diode 250.

Signals input to the decoder are at RS232C levels and pass through a high-voltage level of greater than 3 volts and a low-voltage level of less than −3 volts. The switching characteristics of the receiver interface circuit establish a nonactivating deadband for signals that do not fall outside the +3 volt to −3 volt band. Assuming that the input signal at terminal 258 is less than −3 volts, the voltage at the output of the operational amplifier 260 will be −10 volts. As the input signal increases to a higher voltage, the low-pass filter network of resistor 262 and capacitor 264 produce a low impedance path to ground for frequencies greater than 150 kHz. This filter helps assure that noise signals above 56 kHz are not detected. After capacitor 264 has had time to charge, the voltage at the positive input of the op-amp 260 will begin to rise. Because the output of op-amp 260 is at −10 volts, the diode 266 is reverse biased and feedback resistor 268 is essentially transparent to the circuit. However, diode 270 is forward biased and resistor 272 is, in effect, tied between the input of the op-amp and −10 volts. The current flowing from the input terminal 258 through resistors 262 and 274 and R2 toward the input of the op-amp 260 continues through diode 270 and resistor 272 to −10 volts. The output of op-amp 260 will switch from −10 volts to approximately +5 volts when the voltage at the input of the op-amp reaches zero volts. It takes approximately 0.3 milliamps of current flow from the input of the op-amp through diode 270 and resistor 272 to the output of the op-amp to produce zero volts at the input. This current must flow through resistors 262 and 274 from the input pin 258. This equates to a voltage input at the input pin 258 of three volts and, at this point, the output of the op-amp 260 will switch to +5 volts. The input diode 250 of the photo-isolator 252 will be reverse biased and the output at the collector of phototransistor 276 will rise to a plus logic voltage level. With the output of op-amp 260 now at a higher voltage than the input to the op-amp, the diode 270 will be reverse biased and diode 266 will be forward biased. Current will therefore flow through resistor 268 and cause the voltage at the input of op-amp 260 to rise. This positive feedback arrangement eliminates the possibility of oscillations at the output of the op-amp 260 during transitions between a mark and space state. As long as the voltage at input 258 remains greater than −3 volts, the input to the op-amp will be greater than zero volts and no transitions will occur.

To provide a mark condition (a logic 1), a low-voltage input to the interface circuit is required. The voltage at the positive input of op-amp 260 must become less than zero volts. The output of the op-amp 260 is at approximately five volts. For the input of the op-amp to reach zero volts, approximately 0.3 milliamps of current must flow through resistor 268 and diode 266. This current must also flow through resistors 262 and 274. For this to occur, the voltage at the input terminal 258 must be −3 volts. Once the transition at the output of op-amp 260 occurs, the voltage at the output drops to −10 volts. Diode 270 becomes forward biased and pulls and input to the op-amp to a lower voltage. The input photodiode 250 of the photo-isolator 252 conducts and saturates the output transistor 276 of the photo-isolator. The voltage at the collector of transmitter 276 will therefore switch to a logic low. No transitions can occur until the input voltage at the input terminal 258 rises above +3 volts. The input and output circuits of FIGS. 4 and 5, which provide a high-speed RS232C level interface, provide the speed, drive capability and isolation suitable for the operation of the present invention.

Figure 6:
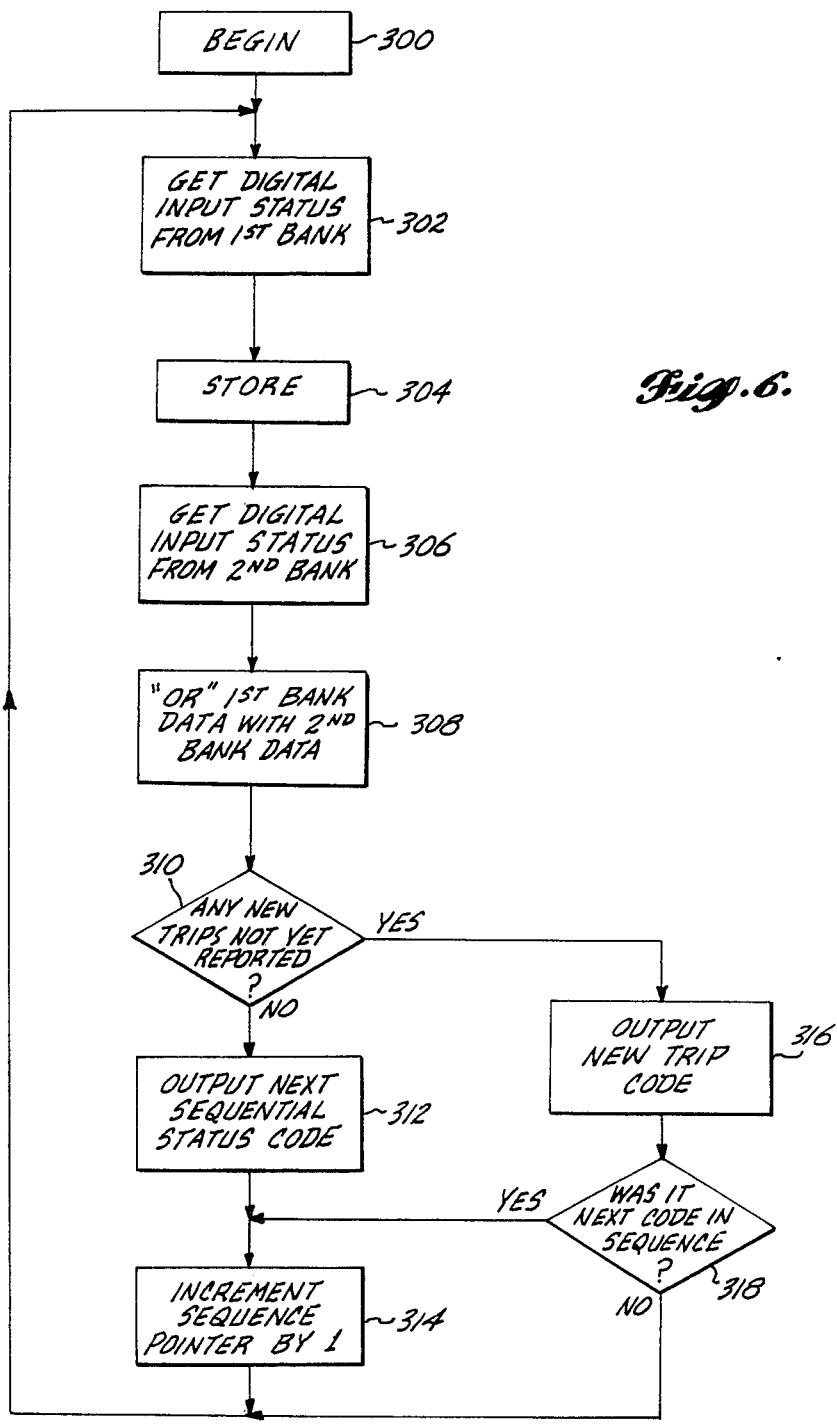
FIG. 6 is a simplified flow chart illustrating the sequential operation of the transmitter portion of the system of FIG. 1 while under program control.

In the preferred embodiment, the monitoring of the data points and assignment of a digital code representative of the status of each of the monitored devices is accomplished by a suitably programmed digital computer operating under program control. FIG. 6 is a simplified flow chart illustrating the operation of the coder/transmitter portion of the system under program control. Upon initialization at BEGIN, step 300, the processor is initialized and the digital information relating to the status of the monitored devices is set to all zeroes. In step 302, the processor reads the digital input from the monitored devices in the first bank of eight inputs and in step 304 stores that information in the form of an eight-bit digital word in a register. At step 306, the second bank of inputs is monitored and a second eight-bit digital word representative of the status bits of the second bank of devices is obtained by the processor. The first and second data bytes are combined in step 308 by an OR function to produce a single eight-bit digital word representative of the current input status of the monitored devices. In step 310, a check of this eight-bit word is made to see whether or not any of the monitored devices have changed from the inactive to active state, that is, from a guard to a trip, and have not yet been transmitted to the remote location. If no new trips are noted, then the processor moves in step 312 to output the next sequential trip or guard code and in step 314 increments the sequence pointer to indicate that the sequence has moved up one. The procesor then returns to again monitor the digital inputs from the monitored devices. If the polling of the input devices indicates in step 310 that a new trip has occurred and has not yet been transmitted, then the computer proceeds to step 316 to output the trip code for the newly discovered trip without regard to whether or not it is the next sequential code to be transmitted. After outputting the new trip code, the computer in step 318, decides whether or not the trip code was the next code to be transmitted. If, in fact, the trip code that was transmitted was the next code in the normal sequence, then step 314 is performed and the sequence pointer is incremented, after which the computer returns to again poll the input devices to get the current status. If the trip code that was transmitted was not the next sequential trip code, then step 314 is skipped and the sequence pointer is not updated prior to the computer's return to poll the input devices for their latest status.

Figure 7:
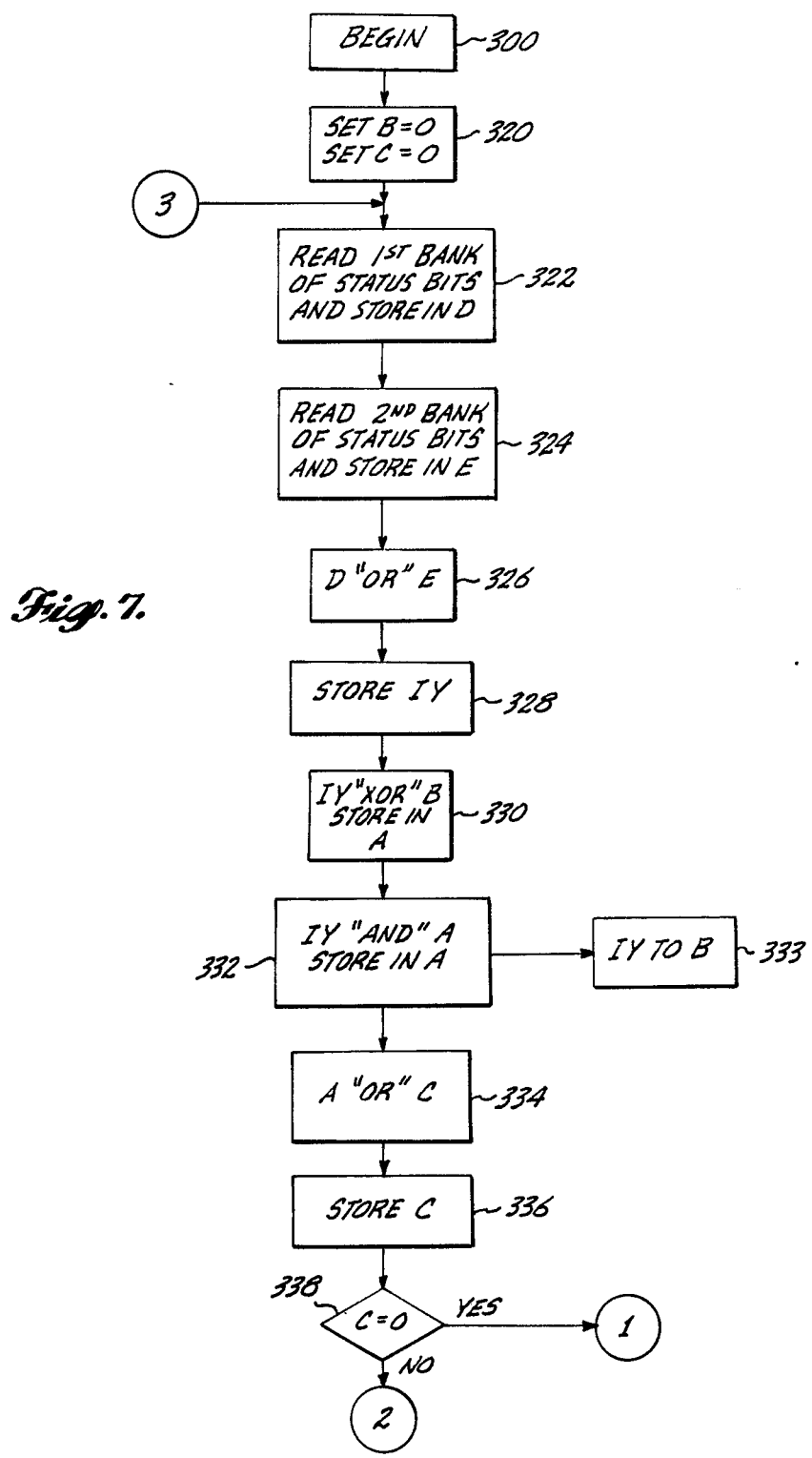
FIGS. 7, 7A and 7B taken together comprise a more detailed flow chart of the operation of the transmitter portion of the system of FIG. 1 under program control.
Figure 7A:
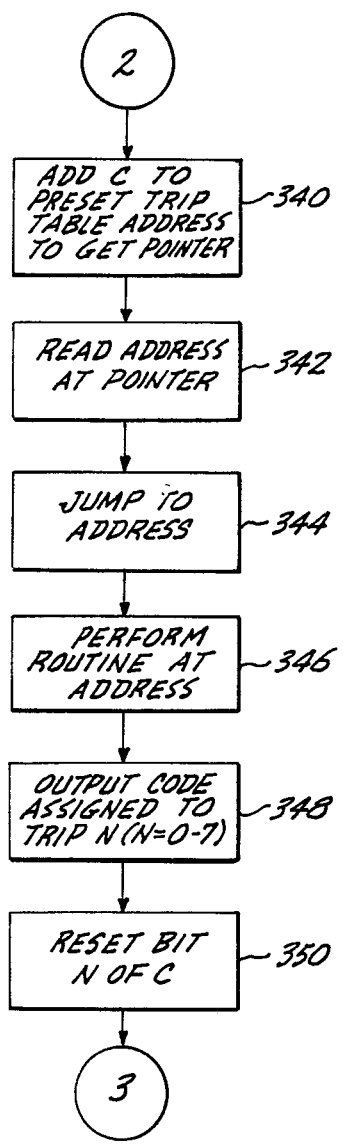
Figure 7B:
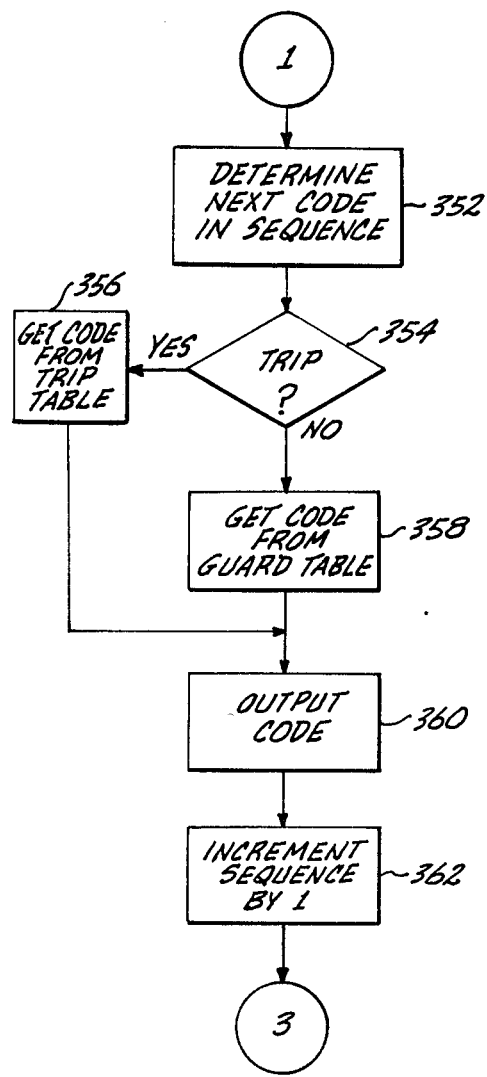

FIGS. 7, 7A and 7B taken together comprise a more detailed flow chart showing the operation of the coder/transmitter portion of the system of the present invention under computer control and particularly showing the operation of interrupting the normal sequence of transmission to transmit new trip information as soon as it is detected. Upon initialization at BEGIN, step 300, a register, designated as "B", (note: the register designations given are arbitrary and are not intended to have direct correlation to the register designations of the Z-80 CPU) which will, in the dynamic state of operation, contain the previously read status information and a second register designated as "C", which will hold the information regarding newly detected trips, are both set to zero. In step 322, the first bank of eight status devices is read and the eight status bits are stored in a register designated as "D". In step 324, the second bank of eight status devices is read and the eight status bits are stored in a register designated as "E". The contents of the D and E registers are then combined by a logical OR function in step 326 and in step 328, the result is stored in a register designated as IY. The contents of the IY register are the contents of the B register, which immediately after initialization are zero, are combined together in step 330 by the logical operation of an EXCLUSIVE OR and the result is stored in the accumulator A. The result of the EXCLUSIVE OR operation is an indication of changes between the previously read status information and the currently read status information and any bit changes will be shown by the contents of the accumulator after step 330. In step 332, the contents of the accumulator are then combined with the current status information in the IY register and this result is stored in the accumulator. The contents of the accumulator after the AND operation of step 332 will be an eight-bit word having logic 1's in the bit positions corresponding to any new trips read in the latest poll of the status devices. In step 334, the contents of the accumulator are then combined by a logical OR function with the contents of the C register and this result is stored back into the C register in step 336. After step 336, the C register contains an eight-bit digital word with 1's in the bit positions corresponding to new trips that have not yet been output from the transmitter. At this point in the operation at step 333, the contents of the IY register, which is the latest digital status information, are stored into the B register for use in the next sequence of digital polling of the status devices.

In step 338, the contents of the C register are analyzed to determine whether C equals zero, meaning that there are no new trips, or whether there are 1's in any of the bit positions in the contents of the C register. If the C register equals zero, meaning that there are no new trips, the program continues step 352 to output the next code in the sequence; however, if there are bits set to "1" in the C register the program moves to step 340 and C is added to a preset trip table address to determine an address to which the program will jump. The trip table is a table containing the start address of routines, designated as Dot 0 to Dot 7 that will cause a trip code to be transmitted. The arrangement of the table is shown in FIG. 8. For each bit position N, the table contains the same address in $2^N$ locations, for example, for bit 0, an address of the routine that will transmit the trip code associated with an active bit 0 is located at $2^0$ or one address in the section of memory set aside for the trip table. Correspondingly, the address for the routine to transmit a trip code corresponding to an active bit 2 will appear at $2^2$ or four locations. This sequence continues so that the routine for transmitting the trip code associated with an active bit N will be found at $2^N$ consecutive locations in the trip table. Referring again to FIG. 7, once the trip table address is determined from the C register contents being added to a preset number in step 340, the routine moves to step 342 and reads the address at the pointer developed in step 340. A step 344 requires the routine to jump to the address developed in step 340 and perform the routine that begins at that address. The result of that routine is the transmission of the trip code associated with bit N at step 348. The way that the routine is set up, the first trip code to be transmitted will be the most significant bit set to a 1 in the contents of the C register. Once the output of the trip code assigned to bit N is completed, bit N of the C register will be reset at step 350 so that the next time through the routine that bit will not be set and the next significant bit in line will be used to determine the trip code to be transmitted. After the resetting of the bit N in the C register, the routine returns to step 322 to take another poll of the status devices to develop a new digital word representative of the status of the devices.

Referring back to step 338, if the contents of the C register are all 0's, then the routine proceeds to step 352 and determines the next code to be transmitted in the predetermined sequence. In step 354, a determination is made as to whether the next code to be transmitted is a trip or a guard. If it is a trip, then, in step 356, the appropriate trip code is obtained from a trip code table, which is stored in another section of memory, and which is simply a table N-bit locations in length, each location containing a 16-bit code divided into two eight-bit bytes representative of the trip for each of the N devices. Similarly, if, in step 354, the next code in sequence is determined to be a guard, then the routine proceeds to step 358 and goes to the guard table to obtain the appropriate guard code. The guard table is identical in format to the trip table but differs in its content. The guard table contains the 16-bit guard codes associated with each of the status devices being in a guard condition. Whether the next code to be transmitted is a guard code or trip code, the program performs step 360 to output the code to the transmission line. The routine then increments the sequence by one in step 362 for the next pass through the loop and returns to step 322 to again poll the status devices. The guard and trip table format is illustrated in FIG. 9.

Figure 10:
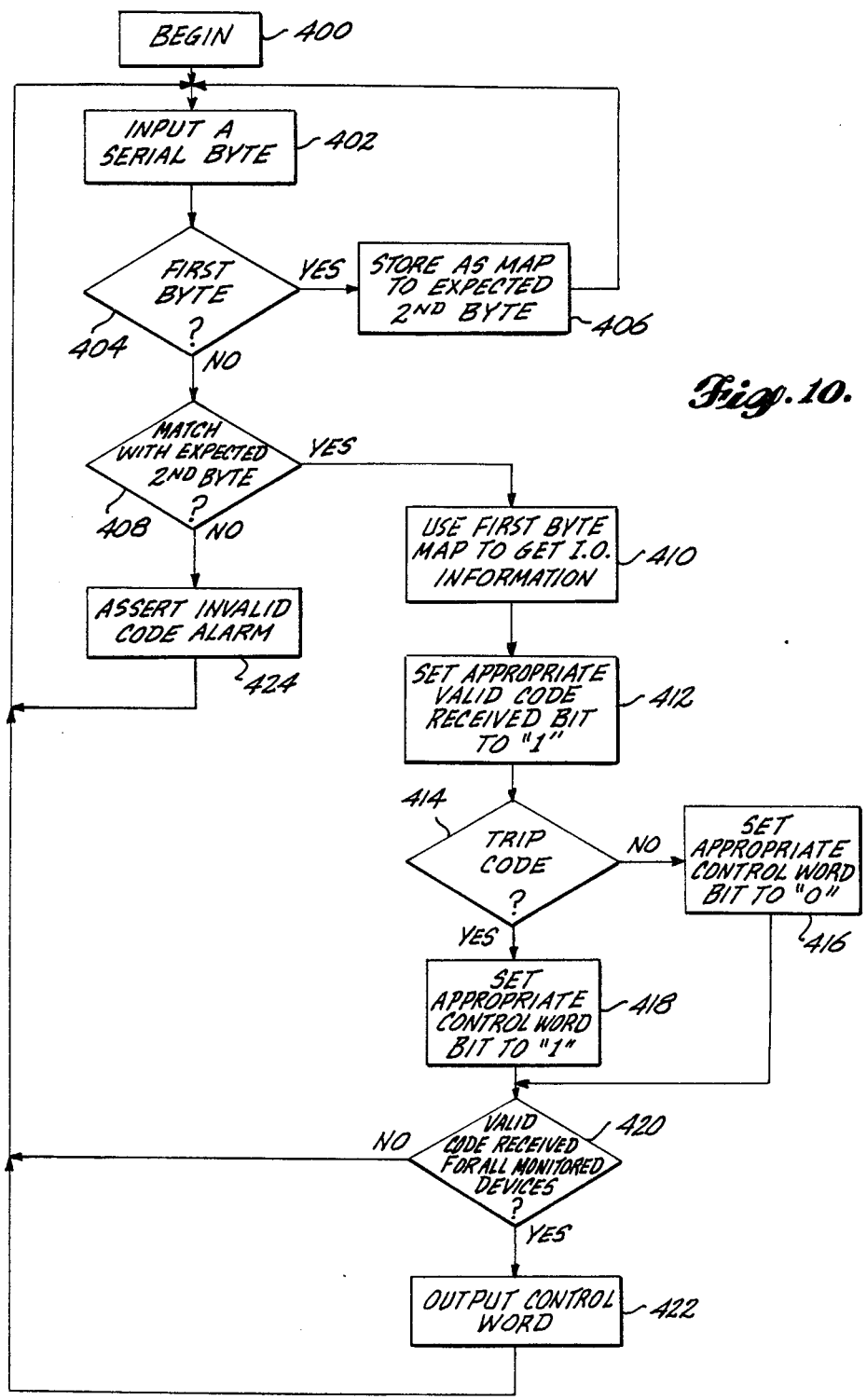
FIG. 10 is a simplified flow chart of the receiver portion of the system of FIG. 1A illustrating the sequential operation of the receiver portion while under program control.

The decoder/receiver portion of the system in the preferred embodiment also includes a digital computer that is operated under program control and a simplified flow chart showing the decoding function of the receiver is illustrated in FIG. 10. The routine starts at BEGIN, step 400, and the receiver inputs at step 402 a serial eight-bit byte of data that is either the first or second byte of a guard or trip code from a remote transmitter. A determination is made at step 404 as to whether the received data is a first or second byte and based on that determination certain operations are conducted with respect to the information received. In the preferred embodiment, the data is received in a continuous stream in an asynchronous mode and the determination of whether a first or second byte is being received is made by toggling a flag bit so that the bit is 0 until reception of a first byte at which time it is toggled to a 1 to indicate that the next byte expected is a second byte. Upon reception of the second byte, the bit is toggled back to a 0 so that the processor expects a first byte in the next transmission. Also, in the preferred embodiment, each time the last code in the sequence is transmitted, a synchronizing character of all 1's is sent that is disregarded by the receiver, except for its recognition as a synchronizing character so that it is clear that the next byte received is a first byte. If, in step 404, it is determined that the information received is a first byte, that information is stored in step 406 in a register indicated as the L register for use in later decoding of the information and the routine returns to step 402 to input another byte of data. If, in step 404, the byte is determined to be a second byte, then the routine continues to step 408 in which a determination is made as to whether the data received is valid as a possible code from the transmitter. It is in this step where the stored first byte data is useful in the validity determination. The validity determination will be explained in greater detail below; however, if it is found that the data is valid, then, in step 410, a determination is made as to which of the status devices being monitored the received information pertains. Once the device has been identified, a corresponding bit is set in step 412 in an arming word to indicate that a valid code has been received for that particular status device. A determination is then made in step 414 as to whether the code received is a trip code or a guard code. Depending on which state the monitored device is in, a corresponding bit in a control word is set to either 0 in step 416 for a guard condition or 1 in step 418 for an active trip condition. The routine then checks in step 420 to see whether a valid code has been received for each of the devices being monitored without interruption by an invalid code of some other malfunction. If, in fact, a valid code has been received for each of the monitored devices, in sequence, then the control word is output in step 422 to indicate the status of the monitored devices at the remote location, with 0's in the control word indicating that the corresponding monitored device is in a guard condition and 1's in the control word indicating that the monitored devices to which those bit positions correspond are in a trip condition. The routine then returns to step 402 to receive another byte of information.

Referring back to step 408 in which the validity of the received data is checked, if the data is found to comprise an invalid code, the routine moves to step 424 and asserts an alarm indicating that an invalid code has been received. The routine also inhibits any output of data until validity of the data has been reestablished. The validity reestablishment is discussed in greater detail below. After setting the alarm, the routine returns to step 402 to input another byte of data.

Figure 11:
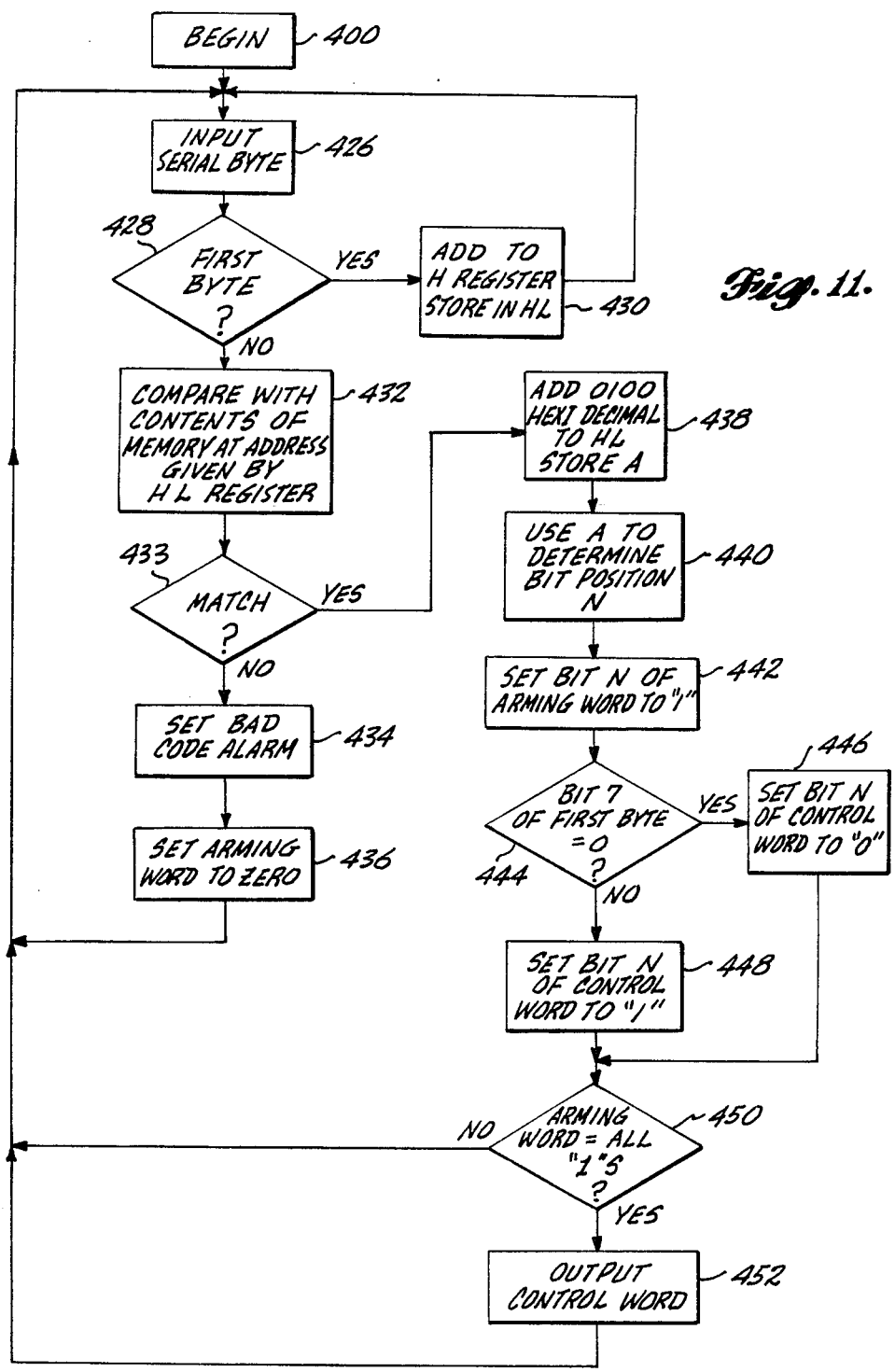
FIG. 11 is a more detailed flow chart showing the operation of the decoder in the receiver portion of the system of FIG. 1A under program control.

FIG. 11 is a more detailed flow chart of the decoding operation and indicates how the first byte of the received code is used to determine both the validity of the data received and the identity of the monitored device to which the received code corresponds. Again, the routine BEGINS at step 400. The receiver inputs an eight-bit byte of digital data at step 426 and in step 428 determines whether the received byte is a first byte or a second byte of the digital code. If it is a first byte, then the byte is added in step 430 to the contents of a register designated as "H", which has been preset to a particular value. The result of the addition is stored in a register that will be designated "HL". The H register is preset to a beginning address of a table containing the addresses of memory locations at which are stored second bytes of valid guard and trip codes for the particular transmitter with which the receiver is coupled.

Figure 12:
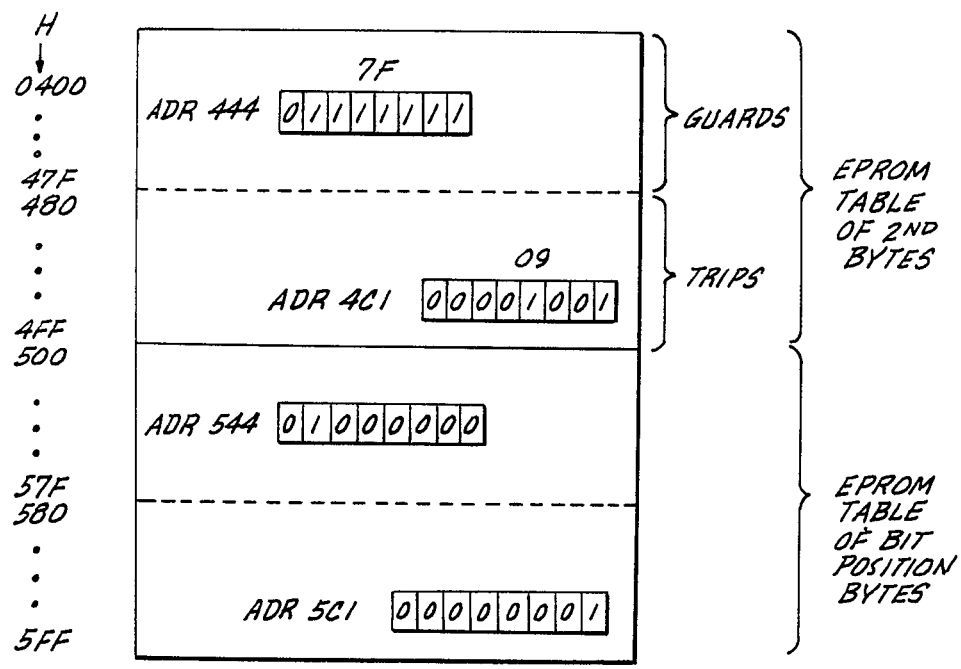
FIG. 12 is a schematic representation of memory locations in a memory storage device in the receiver portion of the system of FIG. 1A that stores information regarding the decoding of signals received by the receiver portion.

FIG. 12 shows in diagrammatic form the setup of the table of valid codes and their relation to the contents of the H and HL registers. In the preferred embodiment, the guard and trip codes are structured so that bit 7, the most significant bit, of the first byte of all guard codes, is a 0 and bit 7 of the first byte of all trip codes is a 1. Therefore, in hexadecimal notation, the first or upper byte of the guard codes can range from 00 to 7F and the first byte of guard codes can range from 80 to FF. The H register is a 16-bit register that is initialized to contain 04 00 hexadecimal. The first byte information is then added as the lower eight bits of the H register contents so that the contents of HL for a guard code can range from 04 00 to 04 7F and for trip codes from 04 80 to 04 FF. A section of memory with address corresponding to the range 04 00 to 04 FF is then set aside as the guard and trip code second byte table. The table is set up so that the memory location at the address given by the HL register for a particular first byte of a guard or trip code contains the expected value of the second byte of the guard or trip code to be received. For example, referring again to FIG. 12, if the guard 6 code is a 44 7F hexadecimal, the first byte 44 is added as the lower eight bits to the H register so that the HL register contains 04 44. The memory location at address 04 44 has stored in it at the time of initialization of the system the second byte of the guard 6 trip code, in this case, 7F. Going back to the flow chart of FIG. 11, when a second byte is detected in step 428, that second byte is compared in step 432 with the contents of the memory location whose address is contained in the HL register and checked for a match in step 433. In the example, memory location 04 44 is read and its contents matched to the received second byte. The received second byte should equal the value of the contents of that memory location, in this case, 7F. If a match is not made, then the received second byte is not a valid code and an alarm is set in step 434 indicating that an invalid code has occurred. Also, in step 436 an arming word that determines whether or not the information should be used in the output of the decoder, is set to all 0's whenever an invalid code is received. The routine then returns to step 426 to receive another byte of data.

If a match occurs in step 433 between the contents of the location addressed by the HL register, and the received second byte, then the routine proceeds to step 438 and 256 decimal or 0100 hexadecimal is added to the HL register and the result stored in register A. The routine then uses the value of the A register to determine the monitored device to which the received data corresponds. The routine does this by reading the contents of the memory location at an address that is within the contents of the A register. The memory location at the address that is in the A register will contain an eight-bit word having one of the bits set to a 1 and the remaining bits to 0. The bit that is set to a 1 will be in the position corresponding to the monitored device. Therefore, in our example given above, where a guard 6 code was transmitted, when 0100 hexadecimal is added to the contents of the HL register, which is 04 44 hexadecimal, the result is 05 44 hexadecimal. The contents of memory location 05 44 will be an eight-bit word having bit 6, corresponding to device 6, set to a 1. The lower portion of the table of FIG. 12 diagrammatically shows the bit position information table. Once the bit position and device number are known, the program causes, at step 442, the same bit position to be set to a 1 in an arming word. In this case, bit position 6 is set to indicate that a valid code has been received corresponding to the status for monitored device 6. The routine at step 444 makes a determination as to whether or not a trip or a guard code was sent by examining bit 7 of the first byte of the received data. If bit 7 is a 0, a guard code has been sent and if bit 7 is a 1, a trip code has been sent. Depending on the determination of step 444, a corresponding bit in an eight-bit control word is set to a 0 in step 446 or a 1 in step 448, corresponding to a guard or trip condition, respectively. In the example, bit 6 of the control word would be set to a 0 to indicate a guard 6 was sent from the transmitter. Once the proper control word bit is set, the routine, in step 450, determines whether or not a control word should be output from the decoder by checking the arming word in step 450. In order for the control word to be sent out, the arming word must be all 1's indicating that a valid code has been received for each of the monitored devices without any intervening invalid codes. Since the arming word is set to all 0's in step 436 upon reception of any invalid code, it is certain that if the arming word is all 1's no intervening invalid codes have been received. If, in fact, the arming word is all 1's, then the routine outputs the eight-bit control word in step 452 having 0's in the locations corresponding to devices in the guard state and 1's in the bit positions corresponding to devices in the trip state. The routine then returns to step 426 to receive another byte of data. If the arming word in not all 1's, then the routine simply returns to step 426 to receive another input byte without sending out a control word and continues to receive and process data until the arming word is satisfied by the reception of a valid code for each of the monitored devices.

To illustrate that the same procedure works for a trip code generation, and example is shown in FIG. 12 of a trip 0 code being C1 09 hexadecimal. The first byte, C1, is added to the H register in step 430 to provide a contents in the HL register of 04 C1. Memory location 04 C1 is then checked to see if it contains the second byte of the trip 0 code, which is 09 hexadecimal. Adding 0100 hexadecimal to the address 04 C1 hexadecimal results in the address 05 C1 hexadecimal. At address 05 C1 is stored an 8-bit word having bit 0 set to a 1 to indicate that the code reeived represents the status of monitored device 0. Since the trip 0 code is a C1 09, bit 7 of the first byte C1 is a 1. The routine, therefore, recognizes that a trip code was received and, taken in combination with the fact that the contents of address 05 C1 had bit 0 set, the decoder recognizes that a trip 0 code was received. The decoder will output a control word having bit 0 set to a 1 to indicate that monitored device 0 is in a trip condition.

The control word that is output from the decoder can be used in any manner desired in the particular environment. In the substation environment where a bank of relays is being monitored on the transmitter end, the control word can be used to set a corresponding bank of relays at the decoder site to corresponding states with the first bank of relays. Alternatively, the control word could be used to energize alarm signals, lights, et cetera, to simply indicate the status of the monitored devices at the remote location rather than taking any affirmative action based on that status. Since the principles of the present invention contemplate use of the actual valid code being sent as a means of verifying the received information, it is necessary that a particular transmitter/receiver pair be matched so that the table of expected second bytes can be loaded with the proper information for the corresponding transmitter.

It will be appreciated that the system just described effectively transmits status information from a group of monitored devices at one location to a remote location for output of a control word based on the status of the monitored devices. The system transmits the information rapidly but has designed in it features to ensure the reliability and accuracy of the transmitted status information. In the event that invalid information is transmitted, a feature is provided by which validity must be reestablished prior to output of any additional information at the remote location. Further, while the system normally transmits the status information in a predetermined sequence, a particular feature of the invention is that the predetermined sequence can be interrupted when necessary to transmit priority information, for example, a change in state from an inactive to an active state of one of the monitored devices. The system is capable of transmitting the information over long distances by any available and suitable communications media, such as microwave transmission, telephone lines, or even dedicated wire, if that is feasible.

Although the present invention is described by reference to a preferred embodiment, and in a particular environment, it will be understood that various modifications, alterations, and substitutions can be made without departing from the spirit of the invention and that the invention can be used in environments other than the power transmission environment in which it is described and illustrated herein. Further, the flow charts provided are satisfactory to enable a programmer of ordinary skill to develop a program in a reasonable amount of time to carry out the method. Accordingly, the scope of the invention should be defined solely by reference to the appended claims.

The embodiments of the invention in which an exclusive property or privilege is claimed are defined as follows:

1. A method of transmitting status information from a first location to a remote second location comprising the steps of:

At the first location:
(a) monitoring the state of a plurality of devices, each of which is in either an active or inactive state;
(b) assembling a table of digital codes such that a distinct code is associated with each possible state of each said device;
(c) determining the current state of each device and assigning the proper digital code for each device in its current state;
(d) determining if any device has changed from the inactive to the active state;
(e) transmitting in a predetermined sequence the codes for each device;
(f) if a change to the active state has occurred for any device, interrupting said predetermined sequence, to transmit the digital code associated with the device that has changed state;

At the second location:
(g) receiving said digital codes in the order transmitted;
(h) comparing the received code with the table to determine the validity of the received code;
(i) if the received code is valid, decoding the code to determine the device and state represented;
(j) outputting the status information based on the most recent code received;
(k) upon reception of any invalid code, inhibiting output so that no status information is output until validity is reestablished; and
(l) reestablishing validity after the reception of a valid code for each of the monitored devices without reception of an intervening invalid code.

2. The method of claim 1 wherein the step of interrupting the sequence of transmission includes:
(a) providing a table of operands wherein each operand corresponds to a predetermined routine, the performance of which interrupts the normal transmission sequence and transmits the predetermined digital code associated with the monitored device that has changed to the active state;
(b) forming a digital data word representative of the monitored devices that have changed to the active state, the digital code for which has not yet been transmitted;

(c) processing the data word to index a position within the table of operands;

(d) performing the routine at the indexed location.

3. The method of claim 2 further including the step of updating the digital data word to indicate that the active state code for a given device has been transmitted.

4. The method of claim 3 wherein N devices are monitored and wherein further the table of operands contains $2^i$ identical entries associated with device i where i equals 0 to N.

5. The method of claim 4 wherein the digital data word contains N bits.

6. The method of claim 1 wherein the digital codes are formatted to have an address portion and a key portion and the step of checking the validity of the received codes includes:

providing a verification table containing said key portion of said codes at predetermined locations within said table;

processing said received ditigal codes to identify said address portion;

processing said address portion to identify a particular location within said verification table;

comparing the contents of said particular location in said verification table with said key portion of said received codes.

7. The method of claim 6 wherein the step of decoding the received code includes:

providing a decode table having stored values related in a predetermined manner to said monitored devices and their state at predetermined locations within said decode table;

processing the address portion of the received code to identify a particular location in the decode table;

reading the stored value at the particular location.

8. The method of claim 7 wherein the most significant bit of each digital code corresponding to an active state is a 1.

9. The method of claim 7 wherein the step of reestablishing validity of the received code includes the steps of:

forming a digital arming word containing N bits, each bit corresponding to one of said monitored devices;

if the contents of said particular location in said verification table and said key portion of said received code do not match, setting all N bits of said arming word to 0;

each time a match occurs between the contents of said particular location in said verification table and said key portion of said received code, setting the bit in said arming word corresponding to the monitored device reprsented by said received code to a 1;

monitoring the arming word for the presence of 1's in all N bits;

outputting status information only when said arming word is all 1's.

10. A system for transmitting status information from a first location to a remote second location, comprising:

At the first location:

first means for monitoring the state of a plurality of devices, each of which can be in either an active or an inactive state and for producing a digital status word representative of the state of the devices;

first memory storage means containing a table of digital codes arranged so that a unique code in said table is associated in a predetermined manner with each device in each of its states;

second means associated with said first means for processing said digital status word and accessing said first memory storage means to retrieve the digital code associated with the current state of each said device, said second means also producing a first signal indicative of a change of state of any of said devices from the inactive to the active state;

transmitter means for receivig said associated digital codes from said second means and transmitting said codes to said second location in a predetermined sequence;

interrupt means associated with said second means and said transmitter means and operable upon the presence of said first signal to interrupt the sequence of transmission of said codes to cause the immediate transmission of the code for the device that has changed from the inactive to the active state;

And at the second location:

receiver means for receiving said transmitted digital codes;

second memory storage means containing a table of values representative of said digital codes;

verification means associated with said receiver means and said second memory storage means for comparing the received digital codes with said values in said table to determine the validity of said received digital codes and for producing an alarm signal in the event that the received digital code does not match one of said values in said table and maintaining said alarm signal until a valid code is received for each monitored device without an intervening valid code being received;

decoder means associated with said receiver means and said comparison means and operable in the absence of said alarm signal to determine the monitored device and state represented by said received digital code;

output means associated with said decoder means for producing and outputting a digital control word representative of the state of the monitored devices; and inhibiting means associated with said decoder means and said output means and operable in the presence of said alarm signal to inhibit the output of said digital control word.

11. The system of claim 10 wherein said second means and said interrupt means are incorporated in a first digital computer and their processing, signal-producing, and interrupting functions are executed by said first digital computer under program control and wherein said comparison means, decoder means, output means, and inhibiting means are incorporated in a second digital computer and wherein their respective comparing, decoding, and inhibiting functions are executed by said second computer under program control.

12. The system of claim 11 wherein said interrupt means includes:

a third memory storage means containing a table of operands wherein each operand corresponds to a predetermined routine, the performance of which interrupts the normal transmission sequence and transmits the digital code associated with the monitored device that has changed to the active state;

first processing means for forming a digital word representative of the monitored devices that have changed to the active state; and second processing means for processing said digital word to index a position within said table of operands corresponding to the monitored device that has changed to the active state, the digital code for which has not yet been transmitted.

13. The system of claim 12 wherein said second processing means also updates said digital word after the performance of the indexed routine to indicate that the active state code for the given device has been transmitted.

14. The system of claim 13 wherein N devices are monitored and wherein further the table of operands contains $2^i$ identical entries associated with each of the monitored devices i where i equals 0 to N.

15. The system of claim 14 wherein said digital word contains N bits, each bit position corresponding to one of the N monitored devices.

16. The system of claim 10 wherein said digital codes are formatted to have an address portion and a key portion and wherein the verification means includes:

a fourth memory storage means containing a verification table having arranged therein the key portions of said digital codes at predetermined locations;

third processing means associated with said receiver means for processing said digital codes to identify said address portion thereof and processing said address portion to identify a particular location within said verification table; and comparison means associated with said third processing means for comparing the contents of said particular location in said verification table with said key portion of said received code.

17. The system of claim 16 wherein said decoder means includes:

a fifth memory storage means containing a decode table having stored therein values related in a predetermined manner to said monitored devices and their state, said values being stored at predetermined locations within said decode table; and fourth processing means associated with said comparison means and said fifth memory storage means for processing the address portion of said received code to identify a particular location in said decode table and reading the value at said particular location.

18. The system of claim 17 wherein the most significant bit of each digital code corresponding to an active state is a logic 1.

19. The system of claim 17 wherein said inhibiting means includes:

an arming means for producing a digital arming word containing N bits, each bit corresponding to one of said monitored devices, said verification means cooperating with said arming means to set all N bits of said arming word to zero in the event said key portion of said received digital code does not match any of the values in said verification table and setting the bit in said arming word corresponding to the monitored device represented by a received code each time the key portion of said received code matches the contents of a location in said verification table; and second monitoring means associated with said arming means for monitoring the arming word for the presence of 1's in all N bits.

* * * * *

UNITED STATES PATENT AND TRADEMARK OFFICE
CERTIFICATE OF CORRECTION

PATENT NO. : 4,551,718  Page 1 of 2
DATED : November 5, 1985
INVENTOR(S) : Cookson et al.

It is certified that error appears in the above-identified patent and that said Letters Patent is hereby corrected as shown below:

| | | |
|---|---|---|
| Column 2, | line 20, | "so" first occurrence should be --no-- |
| | line 44, | "in" should be --is-- |
| Column 4, | line 43, | "interfering" should be --interferring-- |
| | line 51, | insert --a-- before "trip" |
| Column 5, | line 10, | "randomaccess" should be --random-access-- |
| | line 41, | "transmitted" should be --transmitter-- |
| Column 8, | line 7, | "curent" should be --current-- |
| | line 55, | "photoisolator" should be --photo-isolator-- |
| Column 10, | lines 36/37, | "photoisolator" should be --photo-isolator-- |
| | line 58, | "a" should be --an-- |
| Column 11, | line 13, | "produce" should be --produces-- |
| | line 63, | "and" should be --the-- |
| | line 66, | "transmitter" should be --transistor-- |
| Column 12, | line 34, | "procesor" should be --processor-- |
| Column 16, | line 25, | delete "," (comma) after "decoder" |
| Column 17, | line 19, | "and" should be --an-- |
| | line 28, | "recived" should be --received-- |

UNITED STATES PATENT AND TRADEMARK OFFICE
CERTIFICATE OF CORRECTION

PATENT NO. : 4,551,718

DATED : November 5, 1985

INVENTOR(S) : Cookson et al.

It is certified that error appears in the above-identified patent and that said Letters Patent is hereby corrected as shown below:

Column 19, line 54, "reprsented" should be --represented--

Column 20, line 10, "receivig" should be --receiving--

Signed and Sealed this

Eleventh Day of March 1986

[SEAL]

Attest:

DONALD J. QUIGG

Attesting Officer

Commissioner of Patents and Trademarks